United States Patent [19]

Nagano

[11] Patent Number: 4,838,115
[45] Date of Patent: Jun. 13, 1989

[54] PEDAL FOR A BICYCLE
[75] Inventor: Masashi Nagano, Izumi, Japan
[73] Assignee: Shimano Industrial Company Limited, Osaka, Japan
[21] Appl. No.: 184,681
[22] Filed: Apr. 22, 1988
[30] Foreign Application Priority Data Apr. 30, 1987 [JP] Japan .................................. 62-66746

[51] Int. Cl.$^4$ .............................................. G05G 1/14
[52] U.S. Cl. .................................... 74/594.4; 74/594.5
[58] Field of Search ............................. 74/594.1–594.6

[56] References Cited

U.S. PATENT DOCUMENTS

| 508,562 | 11/1893 | Broadbent | 74/594.4 |
| 527,384 | 10/1894 | Davids | 74/594.4 |
| 598,788 | 2/1898 | Kerner | 74/594.4 |
| 611,355 | 9/1898 | Cornell | 74/594.4 |
| 623,399 | 4/1899 | Germaine | 74/594.4 |
| 1,050,384 | 1/1913 | Overton | 74/594 |
| 4,445,397 | 5/1984 | Shimano | 74/594.6 X |
| 4,651,590 | 3/1987 | Thun | 74/594.1 |

FOREIGN PATENT DOCUMENTS

| 503554 | 6/1920 | France | 74/594.4 |
| 1043447 | 11/1953 | France | 74/594.4 |
| 22356 | of 1891 | United Kingdom | 74/594.4 |
| 30033 | of 1897 | United Kingdom | 74/594.4 |
| 5798 | of 1898 | United Kingdom | 74/594.4 |

Primary Examiner—Richard E. Moore
Assistant Examiner—Vinh Luong
Attorney, Agent, or Firm—Stevens, Davis, Miller & Mosher

[57] ABSTRACT

A pedal for a bicycle is provided which includes a shaft unit supporting a tubular member to a pedal shaft through a pair of bearing members. The tubular member is held in particular rotational conditions as adjusted by a pusher and a lock member. A pedal body is detachably fitted onto the shaft unit and the tubular member is fixed to the pedal body through a lock bush which screws with the pedal body. This enables the pedal body to be mounted on the shaft unit in a readily exchangeable condition.

5 Claims, 1 Drawing Sheet

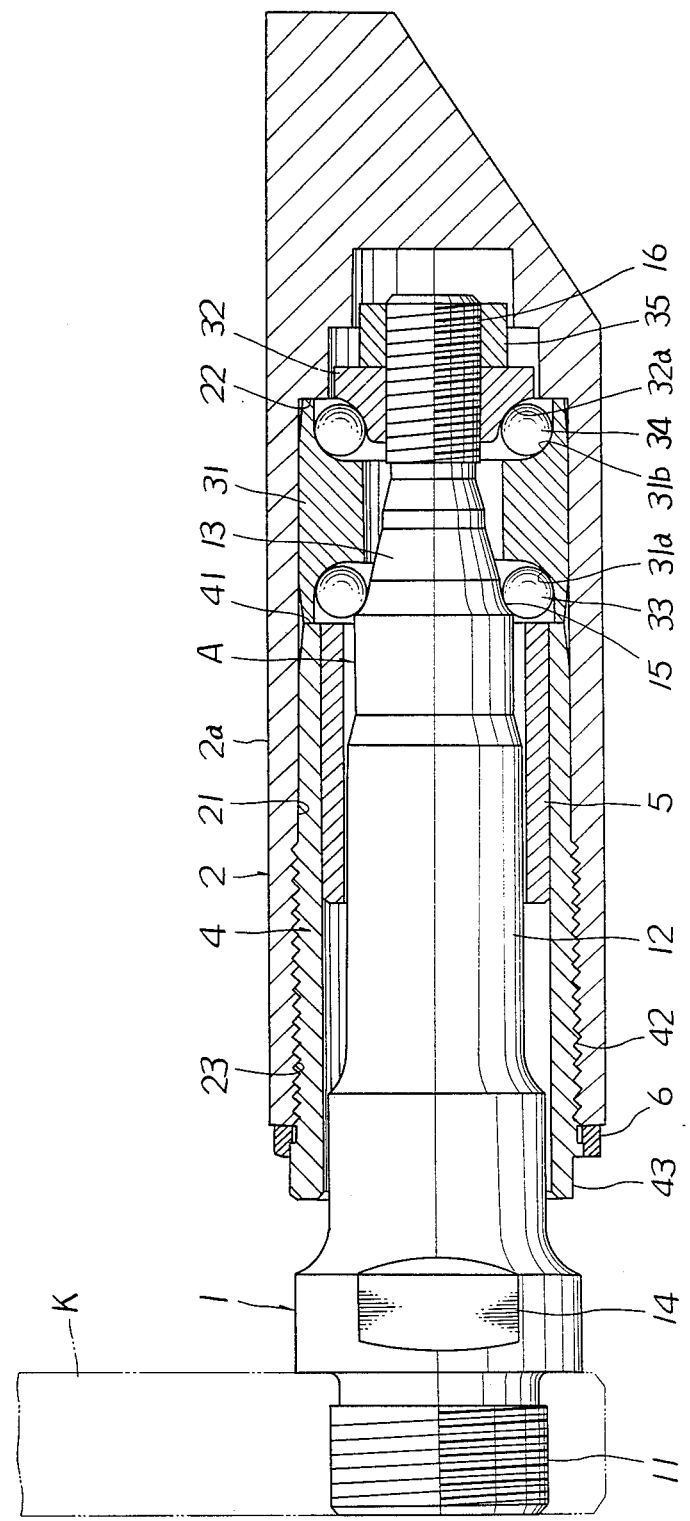

PEDAL FOR A BICYCLE

FIELD OF THE INVENTION

The present invention relates to a pedal for a bicycle, and more particularly, to a pedal for a bicycle, which comprises a pedal shaft mounted on a crank arm of the bicycle and a pedal body rotatably supported to the pedal shaft.

BACKGROUND OF THE INVENTION

The conventional bicycle pedal is provided at the base of the pedal shaft, that is, the mounting portion thereof to the crank arm of the bicycle, with a ball race. Its fore end is provided with a screw thread which screws with a ball holder also having a ball race. The pedal includes at its axially inside and outside portions a receiving bore for receiving therein the pedal shaft with a pair of ball races. A plurality of ball bearings are disposed at the ball race at the base of the pedal shaft. The receiving bore is fitted onto the pedal body, and a plurality of ball bearings are disposed at the axially outside ball race of the pedal body. The ball holder screws with the screw thread at the pedal shaft to adjust the rotational condition, and a lock nut is tightened onto the pedal shaft, thereby fixing the pedal body thereto.

Accordingly, in order to exchange or replace the pedal body on the pedal shaft, the lock nut, ball holder and axially outside ball bearings must be removed. The axially inside balls, as well as the axially outside balls and ball holder, are removed from the pedal shaft, so that, after the pedal body is exchanged, the pedal must be reassembled using the same steps as the original mounting steps and must also be readjusted via operation of the ball holder of the rotational condition of the pedal body, thereby creating a problem in that the pedal body exchanging procedure is difficult and troublesome.

SUMMARY OF THE INVENTION

A main object of the invention is to provide a pedal for a bicycle, which enables free and efficient exchange of a pedal body with respect to a pedal shaft and obviates any necessity to adjust the rotational condition of the pedal body at every exchange.

Another object of the invention is to provide a pedal for a bicycle, which has a good appearance, prevents rain water or dust particles from entering into the bearing members, and has a simple construction.

The pedal for the bicycle of the invention is characterized by providing a shaft unit comprising a pedal shaft, a tubular member rotatably supported to the pedal shaft and having a pair of bearing surfaces and first and second end surfaces positioned at both axial ends of the same, a pair of bearing members for rotatably supporting the tubular member to the pedal shaft, a pusher having the bearing surface of one bearing member so as to adjust the rotational condition of the tubular member and hold the tubular member to the pedal shaft, and a lock member for fixing the pusher at the adjusting position thereof. The invention also includes a pedal body rotatably mounted to the shaft unit and provided with a receiving bore receiving therein the shaft unit and open at at least one end, a first contact portion positioned in the receiving bore and abutting against the first end surface of the tubular member, and a screw thread positioned at the opening side of the receiving bore. The invention further includes a lock bush having a second contact position abutting against the second end surface of the tubular member and a screw thread screwable with the screw thread at the pedal body so that the screw thread at the lock bush screws with that at the pedal body to bring the tubular member into press-contact with the first contact portion at the pedal body to thereby fix the tubular member thereto. According to the invention, the lock bush need merely be removed to make the pedal body removable from the shaft unit.

Accordingly, the pedal for the bicycle of the present invention inserts the shaft unit into the receiving bore at the pedal body and screws the lock bush with the screw thread thereof, thereby enabling the pedal body to be mounted on the shaft unit. Hence, the lock bush is merely rotated to assemble the pedal body with the shaft unit. Thus, the pedal body is simply and quickly exchangeable merely by operating the lock bush.

Moreover, the pedal body is mounted or dismounted onto or from the tubular member which remains adjusted in a constant rotational condition with respect to the pedal shaft, thereby being exchanged. Hence, there is no need that the rotational condition of the pedal body be adjusted at every exchange of the pedal body.

The rotational condition of the tubular member can be easily adjustable without hindrance of the pedal body, because the pedal body is removed, thus yielding free access to the tubular member.

Also, since the pedal body is detachably mounted on the shaft unit through the lock bush, the receiving bore at the pedal body for the shaft unit can be made blind, whereby the pedal has a simple construction, a good appearance, and prevents rain water or dust particles from entering into the bearing members.

These and other objects, features, and advantages of the invention will be more fully apparent upon a reading of the following detailed specification and drawing.

BRIEF DESCRIPTION OF THE DRAWING

The drawing is a longitudinal sectional view of an embodiment of a pedal for a bicycle of the invention.

DETAILED DESCRIPTION OF THE PREFERRED EMBODIMENT

Referring to the drawing, a pedal shaft 1 is mounted on a free end of a crank arm K of the bicycle crank and a pedal body 2 has a foot bearing surface 2a and is rotatably supported to pedal shaft 1. Pedal shaft 1 comprises a base 11 having at its outer periphery a screw thread, an intermediate shaft portion 12 extending axially outwardly from the one axial end of base 11, a fore end portion 13 smaller in diameter than intermediate shaft portion 12 and positioned at the fore end side thereof, and a non-round rotary control 14 provided between base 11 and intermediate shaft portion 12.

In an embodiment shown in the drawing, a tubular member 31 having an axially inwardly facing bearing surface or ball race 31a and an axially outwardly facing bearing surface or ball race 31b is rotatably supported to the outer periphery of fore end portion 13 of pedal shaft 1 through a pair of bearing members 33 and 34 preferably formed of ball bearings and a pusher 32 screwable with a screw thread 16 provided on pedal shaft 1, thereby forming a shaft unit A. Also, at the outer periphery of fore end portion 13 of pedal shaft 1 are formed (1) a bearing surface or ball race 15 for receiving bearing members 33 and (2) a screw thread 16 screwable with pusher 32. Bearing members 33 are interposed between the axially inwardly facing ball race 31a of tubular member 31 and ball race 15 of pedal shaft 1. Bearing members 34 are interposed between the axially outwardly facing ball race 31b at tubular member 31 and a bearing surface or ball race 32a at pusher 32, thereby rotatably supporting tubular member 31 on pedal shaft 1.

The rotational condition of tubular member 31 can be adjusted by adjusting the screwing position of pusher 32. Tubular member 31 is held by pusher 32 to the fore end portion 13 of pedal shaft 1, with the adjusting position of pusher 32 being fixed by locking a lock nut 35.

Tubular member 31, as shown, is substantially smaller in axial length than pedal shaft 1 and has at both axial ends first and second end surfaces abutting against first and second contact portions of pedal body 2 to be discussed in detail below. Ball races 31a and 31b at tubular member 31 are preferably disposed at both axial sides of a position spaced apart by about 60 mm from the edge of base 11 of pedal shaft 1.

Also, pedal body 2 has at its axial center portion a receiving bore 21 having at least one open end, for receiving shaft unit A. Receiving bore 21 includes a first contact portion 22 to abut against the first end surface of tubular member 31 and at its opening side with a screw thread, whereby pedal body 2 is insertable onto the shaft unit A through receiving bore 21.

A lock bush 4 screws with screw thread 23 at pedal body 2 to incorporate shaft unit A in pedal body 2.

Lock bush 4 is provided at one axial end with a second contact portion 41 to abut against the second end surface of tubular member 31 and at the outer periphery of its other axial end with (1) a screw thread 42 screwable with screw thread 23 of pedal body 2 and (2) a rotary control 43. Lock bush 4 screws with pedal body 2 to bring tubular member 31 into press-contact with first contact portion 22 and to tightly position the same between first contact portion 22 and second contact portion 41, thereby fixing tubular member 31 to pedal body 2. Hence, pedal body 2 is assembled with shaft unit A, or removed therefrom, by removing lock bush 4.

In addition, pedal body 2 is formed preferably of aluminum alloy, with receiving bore 21 being formed as a blind bore and provided at its bottom portion with first contact portion 22.

Tubular member 31 has an outer diameter smaller than an inner diameter of receiving bore 21 and is preferably substantially press-fitted thereinto.

In the embodiment shown in the drawing, a tubular contact member 5 having a low friction coefficient is provided at the inner periphery of lock bush 4. Contact member 5 is not indispensable, but can restrain lock bush 4 from making contact at its inner surface directly with the outer periphery of pedal shaft 1, thereby preventing deterioration of the rotational efficiency.

Also, on the outer periphery of rotary control 43 of lock bush 4 is mounted a flexible sealing ring 6 for sealing a gap between the inner surface of receiving bore 21 at pedal body 2 and the outer surface of lock bush 4.

Shaft unit A is constructed as described above, pedal body 2 is detachably inserted thereon, and lock bush 4 only screws with pedal body 2, thereby simply mounting it on shaft unit A. Hence, pedal body 2 can be easily exchanged or replaced merely by operating lock bush 4.

Hence, various pedal bodies 2 having a different foot bearing surface configuration or color can e readily and simply substituted to change the specification of the pedal for use with racing shoes or jogging shoes corresponding to the user's purpose.

When pedal body 2 is exchanged, tubular member 31 remains positioned on pedal shaft 1 and the rotational condition is maintained at a desirable condition, whereby there is no need for the rotational condition to be adjusted at every exchange of pedal body 2, resulting in that pedal body 2 can be simply and readily exchanged.

When the rotational condition becomes deteriorated after a period of use, lock bush 4 is removed to take out shaft unit A from receiving bore 21 at pedal body 2 and pusher 32 is adjusted with respect to its screwing position, whereby the rotational condition is adjustable easily without being hindered by pedal body 2.

The conventional pedal is provided at the pedal body with a thorough bore for receiving therein the shaft unit and a cap is mounted to the axially outward opening of the pedal body. In contrast, pedal body 2 of the present invention has a blind bore for receiving therein shaft unit A, thereby not requiring the cap employed in conventional pedals, and also rain water or dust particles do not enter into receiving bore 21 from the axial outside position. Also, pedal body 2 can be smaller in thickness at its axially outside portion since no cap is used, so that road clearance, when the bicycle turns suddenly or runs on a slope at a racing track or the like, can be enlarged, resulting in that an angle of inclination of the bicycle can be made larger with respect to the road.

Alternatively, receiving bore 21 may be a thorough bore and a cap may be attached to the axial outside opening of pedal body 2. In this embodiment, contact portion 22 may be provided at an intermediate portion of receiving bore 21 and screw thread 23 may be provided at the outside opening. Lock bush 4 may screw with pedal body 2 at the axial outside thereof.

Also, lock bush 4 may alternatively be divided into a tubular portion having screw thread 42 screwable with screw thread 23 and a tubular portion having a second contact portion 41.

Alternatively, tubular member 31 may be divided into a member having an axially inwardly facing ball race 31a and a member having an axially outwardly facing ball race 31b. Also, tubular member 31 may be supported at intermediate shaft portion 12 or across fore end portion 13 and base 11.

As is apparent from the above description, the present invention can use shaft unit A as a common part and a pedal body 2 different in configuration or in design can be selectively mounted thereon, thereby enabling the pedal to be formed in various different configurations. Accordingly, shaft unit A may be mass-produced as the common part to be used in all the various pedal configurations or designs, thereby yielding low manufacturing costs while still enabling expansion of various possible designs.

Also, lock bush 4 need only be rotated to exchange pedal body 2 simply and quickly without the necessity of adjusting the rotational condition each time an exchange is made, and shaft unit A can be easily removed from pedal body 2 and pusher 32 rotated to adjust the rotational condition, thereby facilitating adjustment thereof.

While an embodiment of the invention has been shown and described, the invention is not limited to the specific construction described above, since the above specification embodiment is merely exemplary and the invention is defined solely by the scope of the attached claims.

What is claimed is:

1. A pedal for a bicycle, comprising:
   (a) a shaft unit comprising (i) a pedal shaft, (ii) a tubular member having a pair of bearing surfaces and first and second end surfaces positioned at both axial ends of said tubular member, (iii) a pair of bearing members for rotatably supporting said tubular member to said pedal shaft, (iv) a pusher comprising means for adjusting the rotational condition of said tubular member and for holding said tubular member on said pedal shaft, said pusher having a bearing surface for contacting one of said bearing members, and (v) a lock member for securing said pusher at the adjusting position thereof;
   (b) a pedal body rotatably mounted on said shaft unit and including (i) a receiving bore for receiving therein said shaft unit, said receiving bore being open at at least one axial end and having an inside diameter substantially equal to or slightly larger than an outside diameter of said tubular member, (ii) a first contact position positioned in said receiving bore and abutting against said first end surface of said tubular member, and (iii) a screw thread positioned at a side of said receiving bore adjacent said at least one open axial end of said receiving bore; and
   (c) a lock bush having (i) a second contact portion abutting against said second end surface of said tubular member and (ii) a screw thread engageable with said screw thread of said pedal body, said tubular member being detachable from said pedal body, said screw thread of said lock bush comprising thread means for engaging with said screw thread of said pedal body to bring said tubular member into press-contact with said first contact portion of said pedal body responsive to rotation of said lock bush relative to said pedal body in a first direction to thereby secure said tubular member thereto and to enable said pedal body to be removed from said shaft unit responsive to rotation of said lock bush relative to said pedal body in a second direction opposite to said first direction.

2. A pedal for a bicycle according to claim 1, wherein said pedal shaft is provided with a base and a fore end portion, said tubular member being rotatably supported to said fore end portion.

3. A pedal for a bicycle according to claim 2, wherein said fore end portion of said pedal shaft is smaller in diameter than said base, said tubular member being rotatably supported to said smaller diameter fore end portion smaller in diameter.

4. A pedal according to claim 1, wherein said receiving bore is blind said first contact portion being provided at a bottom portion of said receiving bore.

5. A pedal according to claim 1, wherein said lock bush is provided at its inner surface thereof with a tubular contact member positioned opposite to said pedal shaft through a minute gap and in contact with said pedal shaft through displacement of said pedal body so as to rotatably support said pedal body.

* * * * *